US011661909B2

(12) United States Patent
Taylor (10) Patent No.: US 11,661,909 B2
(45) Date of Patent: May 30, 2023

(54) ROTARY DETONATION ROCKET ENGINE GENERATOR

(71) Applicant: Donald Gene Taylor, Kamas, UT (US)

(72) Inventor: Donald Gene Taylor, Kamas, UT (US)

( * ) Notice: Subject to any disclaimer, the term of this patent is extended or adjusted under 35 U.S.C. 154(b) by 0 days.

(21) Appl. No.: 17/372,105

(22) Filed: Jul. 9, 2021

(65) Prior Publication Data
US 2022/0003189 A1  Jan. 6, 2022

Related U.S. Application Data

(63) Continuation-in-part of application No. 16/133,400, filed on Sep. 17, 2018, now abandoned.

(51) Int. Cl.
| | |
|---|---|
| *F02K 9/95* | (2006.01) |
| *F02K 9/64* | (2006.01) |
| *F02K 9/66* | (2006.01) |
| *F23R 7/00* | (2006.01) |
| *F01D 15/10* | (2006.01) |
| *H02K 7/18* | (2006.01) |

(52) U.S. Cl.
CPC ............. *F02K 9/95* (2013.01); *F01D 15/10* (2013.01); *F02K 9/64* (2013.01); *F02K 9/66* (2013.01); *F23R 7/00* (2013.01); *H02K 7/1823* (2013.01); *F05D 2220/76* (2013.01); *F05D 2240/35* (2013.01); *F05D 2260/20* (2013.01); *F05D 2260/99* (2013.01)

(58) Field of Classification Search
CPC ... F01D 15/10; H02K 7/1823; F05B 2220/76; F02K 9/64; F02K 9/66; F02K 9/95
See application file for complete search history.

(56) References Cited

U.S. PATENT DOCUMENTS

| | | |
|---|---|---|
| 2,474,685 A | 6/1949 | Thelma |
| 2,709,895 A | 6/1955 | Mount |
| (Continued) | | |

OTHER PUBLICATIONS

Bello; "3 Branched PDE Firing;" YouTube [online][video]; (Oct. 25, 2017); [retrieved Jan. 21, 2019]; Retrieved from <URL: https://youtu.be/-Ps-wbiNuXM >.

(Continued)

*Primary Examiner* — Sean Gugger
(74) *Attorney, Agent, or Firm* — Thorpe North & Western, LLP (57) ABSTRACT

A rotary detonation rocket engine generator system can include an axial drive shaft operably coupleable to an electrical generator. At least one support arm is radially coupled to the axial drive shaft and has corresponding rotary detonation rocket engines. An air-fuel mixing chamber receives ambient air and fuel to form an air-fuel mixture and deliver the air-fuel mixture to an annular combustion chamber. At least one pulse detonation combustion chamber is in fluid communication with the annular combustion chamber to receive an oxidizer and fuel to form an oxidizer-fuel mixture. The at least one pulse detonation combustion chamber creates a detonation wave that travels along the at least one pulse detonation chamber to the annular combustion chamber and ignites the air-fuel mixture as the detonation wave travels around the annular combustion chamber to generate thrust force that causes rotation of the axial drive shaft to drive the electrical generator.

26 Claims, 8 Drawing Sheets

(56) References Cited

U.S. PATENT DOCUMENTS

| | | |
|---|---|---|
| 4,577,460 A | 3/1986 | Wiraching |
| 4,590,761 A | 5/1986 | Zettner |
| 5,408,824 A | 4/1995 | Schlote |
| 5,636,509 A | 6/1997 | Abell |
| 5,660,038 A | 8/1997 | Stone |
| 5,873,240 A | 2/1999 | Bussing et al. |
| 6,295,802 B1 | 10/2001 | Lior et al. |
| 6,584,765 B1 | 7/2003 | Tew et al. |
| 6,672,539 B1 | 1/2004 | Schoeneck |
| 8,333,060 B2 | 12/2012 | Witteveen |
| 8,776,493 B1 | 7/2014 | Dawson et al. |
| 9,291,095 B2 | 3/2016 | Koch |
| 2003/0033808 A1 | 2/2003 | Schlote |
| 2004/0128977 A1 | 7/2004 | Wilson et al. |
| 2007/0180815 A1* | 8/2007 | Tangirala ......... F02K 7/02 60/247 |
| 2010/0237716 A1 | 9/2010 | Bright |
| 2014/0360205 A1 | 12/2014 | French et al. |
| 2015/0044018 A1 | 2/2015 | Dierksmeier |
| 2017/0082022 A1 | 3/2017 | Lee |

OTHER PUBLICATIONS

Lawrence Berkeley National Laboratory; "Cookstoves Lab;" Energy Technologies Area; (Aug. 4, 2017); 3 pages; [retrieved Jan. 21, 2019]; Retrieved from <URL: https://eta.lbl.gov/research-development/area/cookstove-testing-facility >.

Siemens; "Siemens Gas Turbine Portfolio;" [brochure]; www.siemens.com/gasturbines; (2017); 24 pages; Article No. PGDG-B10006-05-4A00.

U.S. Energy Information Administration; "What is U.S. Electricity Generation by Energy Source?—Frequently Asked Questions;" Official Energy Statistics from the U.S. Government; (Oct. 29, 2018).

* cited by examiner

ROTARY DETONATION ROCKET ENGINE GENERATOR

RELATED APPLICATION

This application is a continuation-in-part application of U.S. application Ser. No. 16/133,400, filed Sep. 17, 2018 which is incorporated herein by reference.

BACKGROUND

Generating electricity, particularly on a large industrial scale, has various challenges depending on the particular system implemented. Coal and fossil fuel power plants suffer from pollution issues, and typically include complex systems that have a number of energy losses and have high startup and operating costs. Nuclear power plants also suffer from pollution issues, and require high startup, high operating costs, and complex systems that also have a number of energy losses and other issues to address. Clean energy generator systems, such as wind, hydroelectric, and solar generated power systems, are not always reliable in terms of available clean energy to convert to electrical energy. Such alternative energy systems can also be complex and consume a large area of land to produce relatively small amounts of electricity compared to traditional fuel power plants.

SUMMARY

The present disclosure sets forth a rotary detonation rocket engine generator system for producing electrical energy. The rotary detonation rocket engine generator system can include an axial drive shaft operably coupleable to an electrical generator. The rotary detonation rocket engine generator system can also include at least one support arm coupled to and extending radially from the axial drive shaft. Additionally, the rotary detonation rocket engine generator system can include at least one rotary detonation rocket engine supported at an end of the at least one support arm. The at least one rotary detonation rocket engine can have an air-fuel mixing chamber operable to receive ambient air from an air inlet and fuel from a first fuel supply to form an air-fuel mixture. The at least one rotary detonation rocket engine can also have an annular combustion chamber operable to receive the air-fuel mixture from the air-fuel mixing chamber. In addition, the at least one rotary detonation rocket engine can have at least one pulse detonation combustion chamber in fluid communication with the annular combustion chamber. The at least one pulse detonation combustion chamber can be operable to receive an oxidizer from an oxidizer supply and fuel from a second fuel supply to form an oxidizer-fuel mixture. The at least one pulse detonation combustion chamber can be configured such that the oxidizer-fuel mixture detonates following ignition and creates a detonation wave that travels along the at least one pulse detonation chamber to the annular combustion chamber and ignites the air-fuel mixture as the detonation wave travels around the annular combustion chamber thereby generating thrust force that causes rotation of the axial drive shaft to drive the electrical generator to produce electrical energy.

In one example, the first and second fuel supplies are the same fuel supply.

In one example, the fuel comprises hydrogen.

In one example, the oxidizer comprises oxygen.

In one example, the at least one pulse detonation combustion chamber comprises a plurality of pulse detonation combustion chambers.

In one example, the at least one pulse detonation combustion chamber comprises a tube oriented perpendicular to a flow direction of the air-fuel mixture through the annular combustion chamber.

In one example, the ambient air is the only oxidizer forming a mixture with the fuel in the air-fuel mixing chamber.

In one example, the rotary detonation rocket engine generator system further comprises a coolant supply operably coupled to the annular combustion chamber to cool the annular combustion chamber.

In one example, the rotary detonation rocket engine generator system further comprises a rotating chassis fixedly coupled to and supporting the at least one support arm, and a fixed base rotationally coupled to and supporting the rotating chassis.

In one example, the fixed base is rotationally coupled to the rotating chassis via a bearing.

In one example, the bearing comprises a slewing bearing.

In one example, the at least one support arm comprises opposing support arms, and the at least one detonation rocket engine comprises opposing detonation rocket engines each coupled to a respective one of opposing support arms.

In one example, the axial drive shaft comprises an axial fluid channel extending through the axial drive shaft, and wherein the opposing support arms each include a radial fluid channel in fluid communication with the axial fluid channel and the opposing detonation rocket engines, such that the radial fluid channels and the fluid conduit define a fuel supply line which supplies the fuel to the opposing detonation rocket engines.

In one example, the detonation engine assembly further comprises a rotary union device coupled to the axial drive shaft which transfers fuel from a fuel source and into the axial fluid channel of the axial drive shaft.

In one example, the opposing detonation rocket engines comprise a pair of detonation rocket engines, and the opposing support arms comprise a pair of support arms coupled to and extending generally orthogonally from the axial drive shaft and supporting respective detonation rocket engines, such that the detonation rocket engines are separated from each other by approximately 180 degrees.

In example, the rotary detonation rocket engine generator system further comprises a housing that encloses the at least one detonation rocket engine, the at least one support arm, and at least a portion of the axial drive shaft.

In one example, the housing further comprises a fluid outlet configured to allow removal of exhaust products from within the housing.

The present disclosure sets forth a method of producing electricity comprising supplying a fuel to at least one detonation rocket engine radially coupled to an axial drive shaft, and igniting the fuel to cause combustion in the at least one detonation rocket engine to generate a thrust force that causes the at least one detonation rocket engine to rotate the axial drive shaft, which generates electrical energy with an electrical generator coupled to the axial drive shaft.

In another example, the method further comprises supplying oxygen through oxygen supply channels of the axial drive shaft and of at least one support arm coupling the at least one detonation rocket engine to the axial drive shaft. The operation of supplying the fuel to the at least one detonation rocket engine comprises supplying fuel through fuel supply channels of the axial drive shaft and of the at least one support arm.

In one example, the operation of supplying the fuel to the at least one detonation rocket engine comprises transferring the fuel through a fuel inlet of a rotary union device fluidly coupling a fuel source to an axial fuel channel of the axial drive shaft.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

These drawings are provided to illustrate various aspects of the invention and are not intended to be limiting of the scope in terms of dimensions, materials, configurations, arrangements or proportions unless otherwise limited by the claims.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

In describing and claiming the present invention, the following terminology will be used.

The singular forms "a," "an," and "the" include plural referents unless the context clearly dictates otherwise. Thus, for example, reference to "a support" includes reference to one or more of such materials and reference to "expanding" refers to one or more such steps.

As used herein, the term "about" is used to provide flexibility and imprecision associated with a given term, metric or value. The degree of flexibility for a particular variable can be readily determined by one skilled in the art. However, unless otherwise enunciated, the term "about" generally connotes flexibility of less than 2%, and most often less than 1%, and in some cases less than 0.01%.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used herein, the term "at least one of" is intended to be synonymous with "one or more of." For example, "at least one of A, B and C" explicitly includes only A, only B, only C, and combinations of each.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plusfunction limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

Combustion can be categorized as deflagration or detonation. Deflagration is typified by a regular flame, which propagates at less than the speed of sound. Detonation, on the other hand, is where the flame (i.e., reaction front) moves faster than the speed of sound in the material that is burning. This creates a shock wave(s) and much higher resultant pressures. A pulsed detonation engine (PDE) is one type of engine that uses detonations for propulsion. In a PDE, a detonation chamber is filled with a fuel/oxidizer mixture. The fuel/oxidizer mixture is then detonated, which propels the exhaust from the chamber and generates thrust. This cycle is repeated by refilling the detonation chamber with a fresh fuel/oxidizer mixture, which is detonated for another generation of thrust. Thus, in a PDE, the thrust is not generated continuously. In some PDEs, detonation does not occur at the outset of combustion, but follows an initial deflagration of the fuel/oxidizer and transitions to detonation as the reaction accelerates. In such cases, the fuel/oxidizer can be introduced at one end of an elongated chamber (e.g., a tube), and a deflagration-to-detonation transition can occur as the reactants accelerate along the chamber, generating a shock wave. The reaction products are carried by the detonation front and accelerated from the end of the chamber, thereby generating thrust. A rotation detonation engine (RDE) is an extension of PDE technology that makes the detonation a quasi-continuous process. Instead of the detonation wave merely exhausting out of a long tube, the detonation wave is confined to travel around a circular channel. PDE and RDE principles are applicable to the present technology, as discussed in more detail below.

Figure 1A:
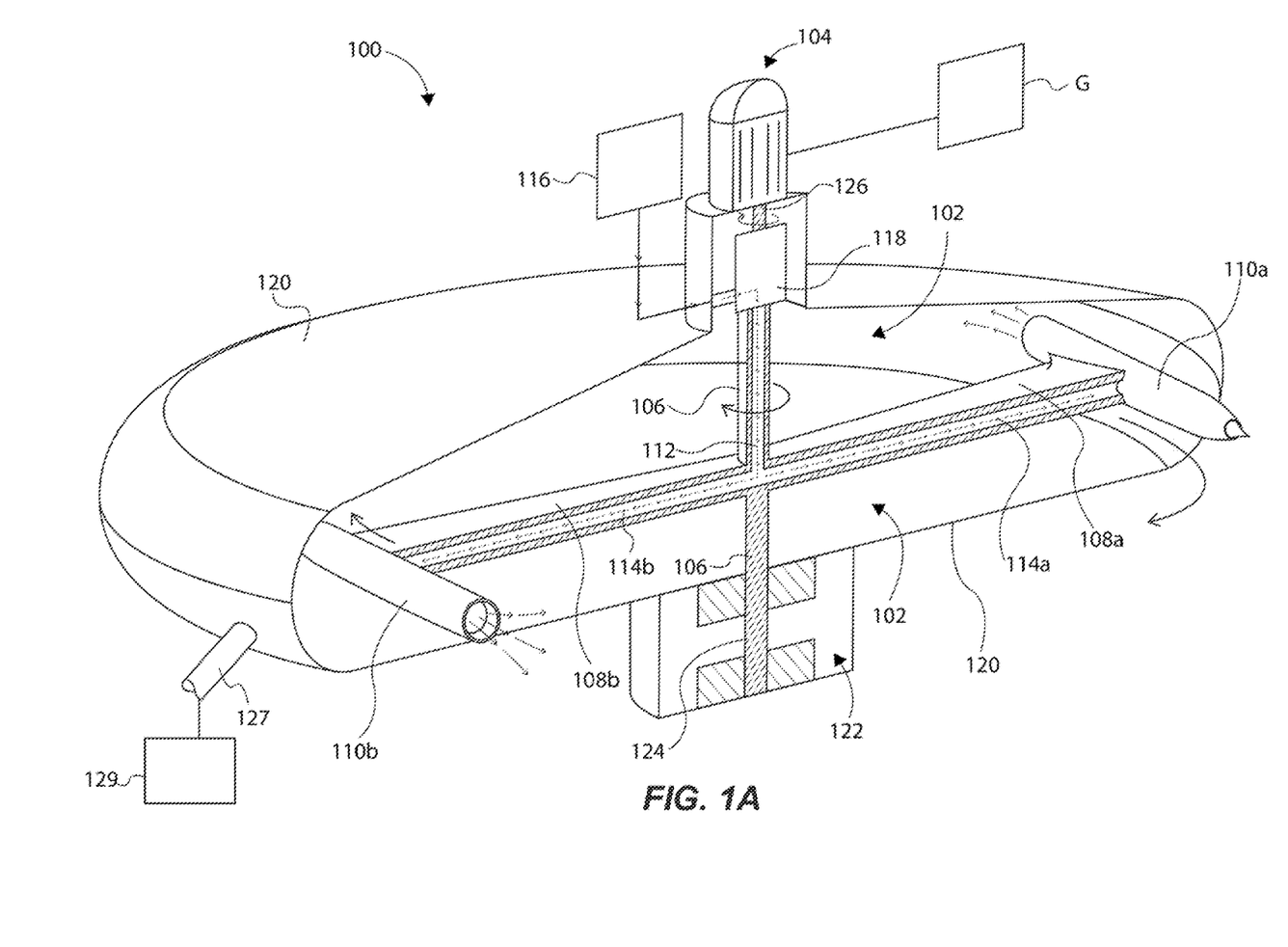
FIG. 1A is an isometric view of a rotary detonation rocket engine generator system, and showing certain components schematically in accordance with an example of the present disclosure.
Figure 1B:
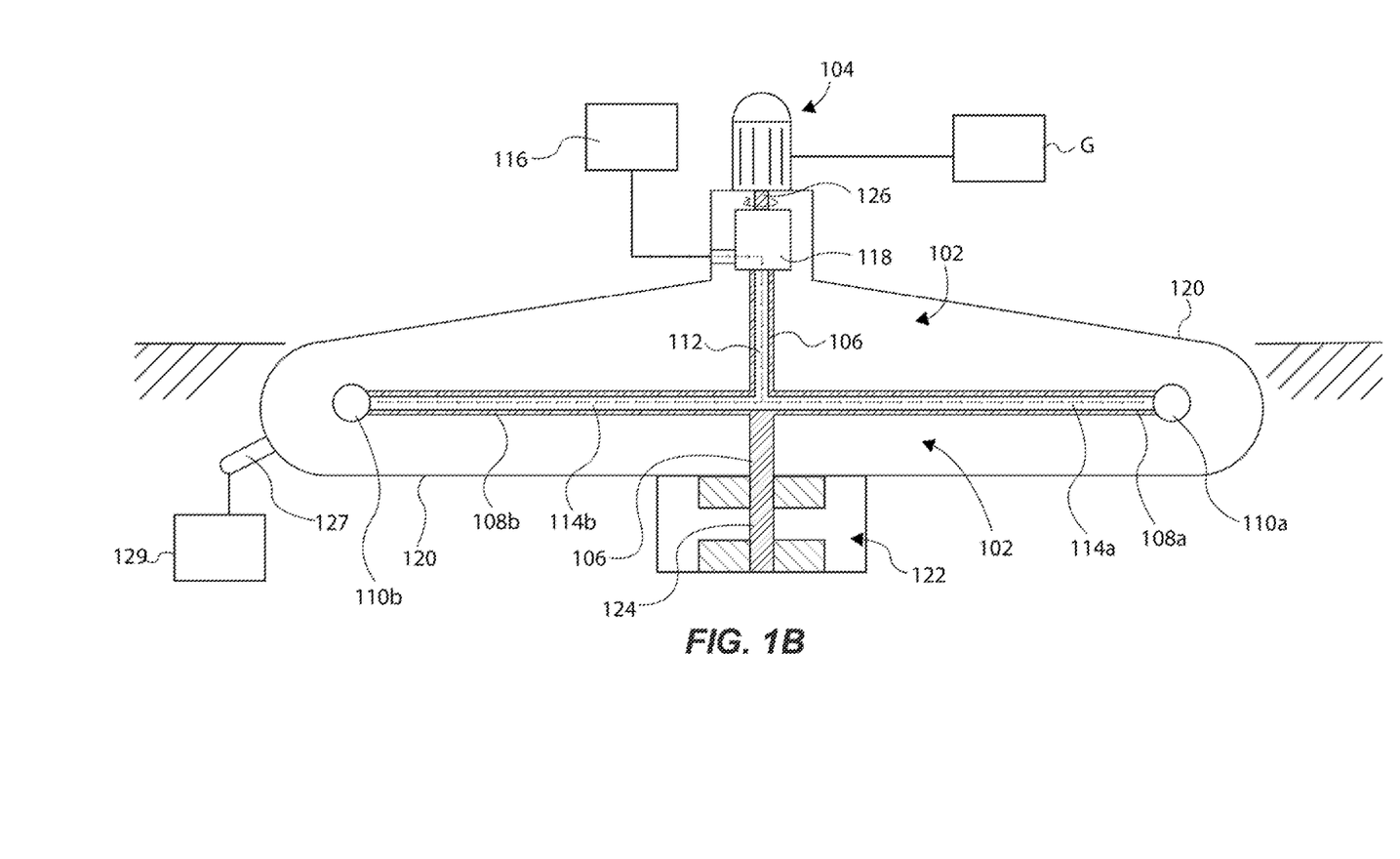
FIG. 1B is a side cross sectional view of the system of FIG. 1A.

FIGS. 1A and 1B illustrate a rotary detonation rocket engine generator system 100 in accordance with an example of the present disclosure. As an overview, the rotary detonation rocket engine generator system 100 can comprise a detonation engine assembly 102 coupled to an electrical generator 104 for generating electrical power, such as for supplying to a power grid G, battery storage, site power generation, or the like. The detonation engine assembly 102 can comprise an axial drive shaft 106 coupled to the electrical generator 104. The detonation engine assembly 102 can comprise support arms 108a and 108b coupled to and extending radially from the axial drive shaft 106. Opposing detonation rocket engines 110a and 110b can be supported at distal ends of the opposing support arms 108a and 108b. Alternatively, if an odd number of support arms and detonation rocket engines are used, the support arms can be circumferentially evenly distributed to form a circumferential envelop defined by rotary motion of the rocket engines. Regardless, in response to ignition and combustion of a fuel supplied to each of the detonation rocket engines 110a and 110b, a thrust force is generated by each of the opposing detonation rocket engines 110a and 110b, which causes rotation of the axial drive shaft 106 to drive the electrical generator 104.

More specifically, and in one example, the axial drive shaft 106 can comprise an axial fluid channel 112 that extends through the axial drive shaft 106. The opposing support arms 108a and 108b can include respective radial fluid channels 114a and 114b in fluid communication with the axial fluid channel 112 and with fuel inlets of respective detonation rocket engines 110a and 110b. A fuel supply source 116 can be operatively coupled to the axial drive shaft 106 in a manner such that a fuel line from the fuel supply source 116 is in fluid communication with the axial fluid channel 112, and therefore with the radial fluid channels 114a and 114b and the detonation rocket engines 110a and 110b. A rotary union device 118 can be coupled to the axial drive shaft 106 and to the fuel line of the fuel supply source 116 in a manner to transfer fuel, oxygen, hydrogen, and/or steam from the fuel supply source 116 into the axial fluid channel 112 of the axial drive shaft 106. In this way, the axial drive shaft 106 can be coupled to one side (or input component) of the rotary union device 118 in a suitable manner, while an output drive shaft 126 can be coupled to the other side (or output component) of the rotary union device 118 and coupled to the electrical generator 104. The rotary union device 118 is shown schematically as a box for illustration clarity, and because rotary union devices for supplying one or more of fluid, gas, fuel, etc. through one or more lines into a rotating component (e.g., axial drive shaft 106) are well known in the industry, and can be complex systems, and therefore will not be discussed or shown in detail herein. However, some non-limiting examples of rotary unions that could be used include rotary unions supplied by Dynamic Sealing Technologies, Inc., Stenring, Inc., Kadant, Inc., and others. Note that the output drive shaft 126 would normally rotate at the same rate as rotation of the axial drive shaft 106, because the rotary union device 118 transfers such rotational energy from one shaft to another shaft (or to an outer sleeve), as with typical rotary union devices.

The fuel supply source 116 can comprise different fuel, fluid or gas supply sources and systems for separately (or collectively) supplying fuel, air, oxygen, steam, or other fluids from the fuel supply source 116, through the rotary union device 118, and into the axial fuel channel 112. Accordingly, one or more separate fluid flow lines may be defined by a flow path from the fuel supply source 116 through the axial fuel channel 112 and through each of the radial fluid channels 114a and 114b for separately supplying fuel and oxygen, for instance, to inlets of the detonation rocket engines 110a and 110b for detonation (see e.g., the below discussion regarding FIG. 4). Alternatively to the fuel supply system shown in FIGS. 1A and 1B, the radial fluid channels 114a and 114b can be replaced with external fuel supply lines attached to an outer surface of the support arms 108a and 108b. In another example, the fuel and oxygen (or other fluids) can be combined at the fuel supply source 116, and then transferred via a single supply flow path through the rotary union device 118, the axial drive shaft 106, each of the support arms 108a and 108b, and to the detonation rocket engines 110a and 110b for combustion.

The rotary detonation rocket engine generator system 100 can further comprise a housing 120 that encloses the opposing detonation rocket engines 110a and 110b, the opposing support arms 108a and 108b, and at least a portion of the axial drive shaft 106. A bearing assembly 122 can be attached to a lower side of the housing 120 for supporting a lower end section 124 of the axial drive shaft 106 (or the lower end section 124 can be a separate shaft coupled to the axial drive shaft 106 proximate the coupling interface of the support arms and the axial drive shaft). Another bearing assembly (not shown) can be optionally supported at an opposing side of the housing 120 for rotatably supporting the axial drive shaft 106, or the rotary union device 118 can act as a bearing for an upper end of the axial drive shaft 106.

In one example, the housing 120 can comprise an exhaust outlet 127 configured to allow removal of exhaust products from within the housing 120 that are exhausted from the detonation rocket engines 110a and 110b. Exhaust products can be removed through the exhaust outlet 127 either passively (e.g., pressure differentials between ambient and within the housing), or actively using an exhaust device 129, such as a pump, induction blower, or steam induction device. In one aspect, the exhaust products can be biofiltered before storage, sequestering, release, heat recovery, or further processing.

In the examples discussed herein, aerodynamic consistency can be enhanced by providing a housing (e.g., housing 120), which can be large enough to allow rotation of detonation rocket engine(s) without interference or creation of undesirable aerodynamic fluid flows within the housing.

As shown best in FIG. 1A, the opposing support arms 108a and 108b and the attached opposing detonation rocket engines 110a and 110b can extend orthogonally and radially (outwardly) from the axial drive shaft 106 in opposite directions from each other, such that the opposing detonation rocket engines 110a and 110b are radially situated approximately 180° away from each other and perpendicular to the axial drive shaft 106. In another example, the support arms of a particular system could extend downwardly or upwardly at an angle (non-perpendicular angle) relative to a longitudinal axis of the axial drive shaft 106. In other examples, more than two opposing detonation rocket engines can be incorporated into a particular detonation engine assembly (see e.g., FIG. 5). For example, three, four or five opposing detonation rocket engines can be radially distributed at 120°, 90°, or 72°, respectively, such that detonation rocket engines are evenly distributed circumferentially around the axial drive shaft 106. In other examples, more than five opposing detonation rocket engines can be incorporated, such as up to eight, twelve or more. In this way, the term "opposing" detonation rocket engines can mean directly opposite each other, or it can mean three or more detonation rocket engines that oppose each other via even and balanced circumferential radial distribution, such as being adjacent and separated by 90°, which could be four "opposing" detonation rocket engines. In another example, only one detonation rocket engine may be incorporated into a particular generator, in which case a counterbalancing mass can be mounted to an opposing arm from the support arm that supports the one detonation rocket engine.

In operation and with continued reference to FIGS. 1A and 1B, one or more fluids (e.g., oxygen and fuel) are supplied from the fuel supply source 116, through the rotary union device 118, through the axial fluid channel 112, through the radial fluid channels 114a and 114b, and then injected into fuel inlets of the detonation rocket engines 110a and 110b. Once injected, the fuel can be ignited and combusted, and then exhausted out the nozzles of the detonation rocket engines 110a and 110b, which generates a thrust force that causes the detonation rocket engines 110a and 110b to move forward. Such forward thrust imparts a rotational force on the axial drive shaft 106 via the detonation rocket engines 110a and 110b being constrained to the axial drive shaft 106 by the support arms 108a and 108b. Such rotation of the axial drive shaft 106 generates electricity via the electrical generator 104.

In one example, as shown in FIG. 1B, the axial drive shaft 106 can be oriented generally vertically or orthogonally relative to the earth or a ground surface, while the support arms 108a and 108b can be oriented generally horizontal or parallel to the earth or a ground surface. This vertical configuration of the axial drive shaft 106 can reduce asymmetric stresses in the axial drive shaft 106 (and other rotational components) because a gravitational force would be acting more uniformly on the rotating components as compared to being oriented off-vertical.

Figure 2:
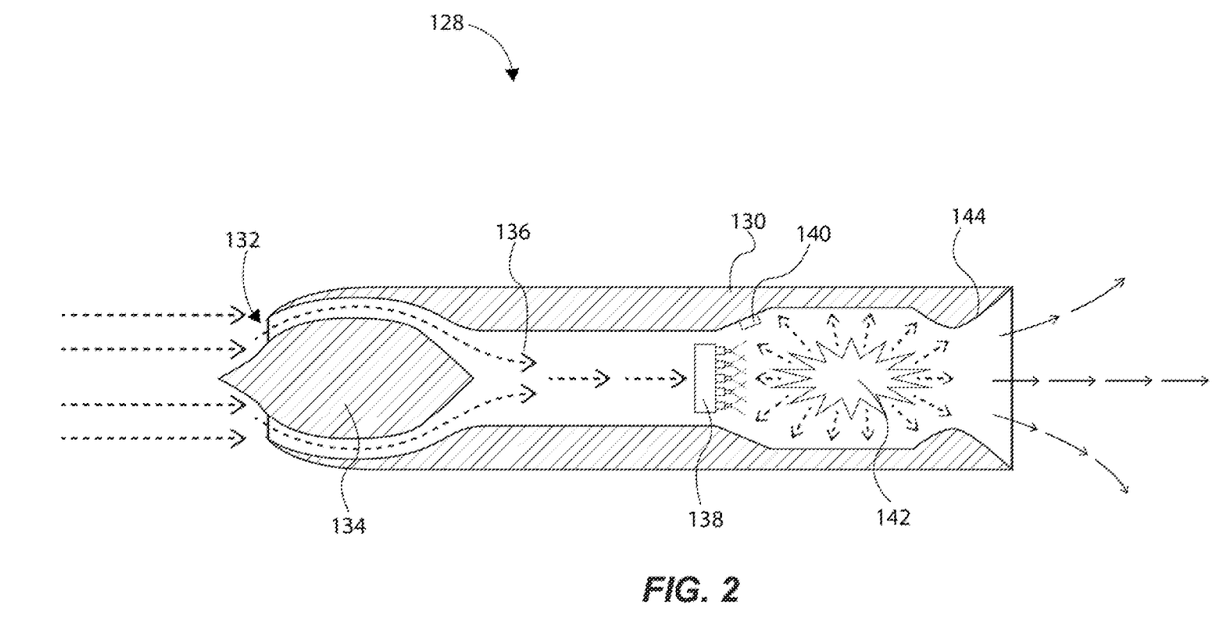
FIG. 2 is a side cross sectional view of a detonation rocket engine that could be incorporated with the system of FIG. 1A, in accordance with an example of the present disclosure.

A particular detonation rocket engine can be a continuous detonation rocket engine, a pulse detonation rocket engine, a ramjet rocket engine, or a scramjet rocket engine. In one specific example, the detonation rocket engine can be a linear detonation combustor. For example, one or more linear tubes can be arrayed in parallel to provide detonation tubes which are optionally arranged with one-way valves and interconnections to control detonation wave paths. In one alternative, the linear detonation combustor can have an annular array of parallel linear detonation tubes. FIG. 2 shows a cross sectional view of one example of a detonation rocket engine 128 that can be incorporated with the system of FIGS. 1A and 1B (and FIG. 5). The detonation rocket engine 128 can include a rocket body 130, an air inlet 132, an inner body 134, a diffuser 136, and fuel sprayers 138 that can be coupled to the fuel supply source 116 via the aforementioned fuel supply lines. An igniter 140 can be positioned adjacent the fuel sprayers 138 for ignition and combustion of the fuel in a combustion chamber 142, so that combusted gases exit through a nozzle 144 and out of the detonation rocket engine 128 for expansion of exhaust gases, which produces thrust of the detonation rocket engine 128. It should be appreciated by those skilled in the art that suitable detonation rocket engines can be incorporated with the systems described herein for generating subsonic or supersonic rotational movement of the detonation rocket engines and the axial drive shaft.

The detonation rocket engines exemplified herein can have aerodynamic leading portion (e.g., FIG. 2) proximate the air inlet, which increases transfer of energy from combustion and expansion into momentum of the detonation rocket engines and support arms while minimizing aerodynamic friction resistance. This is particularly useful for supersonic rocket engines that benefit from supersonic airflow into the rocket engine, like scramjets and ramjets. The expansion outlets (e.g., nozzles 144) can be contoured to optimize thrust upon exit of gases from the detonation rocket engine. In one aspect, the expansion outlet can be a de Laval configuration, although other nozzle contours and throat configurations can be used.

Figure 3:
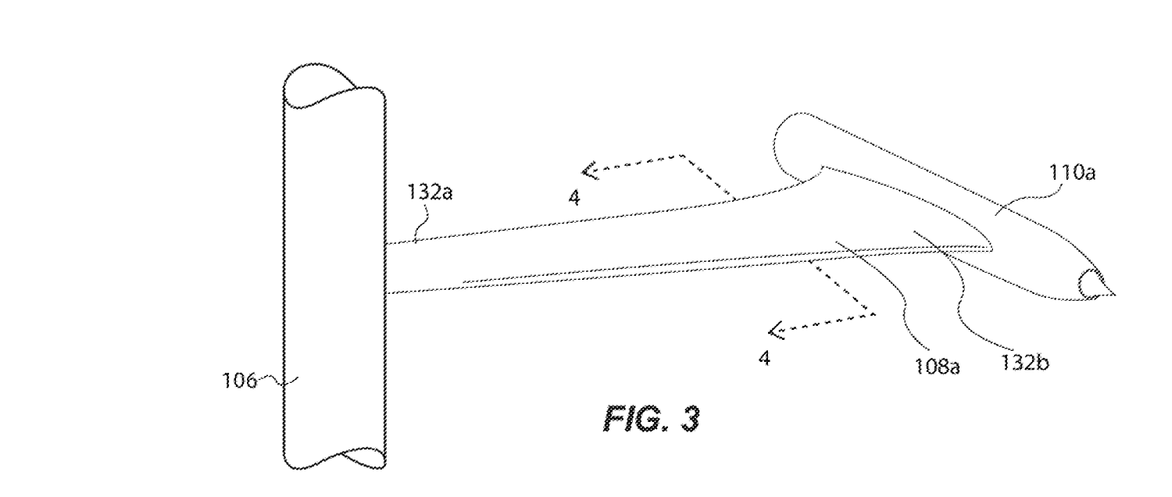
FIG. 3 is an isometric view of a portion of the system of FIG. 1A, showing an axial drive shaft and detonation rocket engine coupled together by a support arm.

FIG. 3 shows the support arm 108a and the detonation rocket engine 110a attached to the axial drive shaft 106. Any suitable devices can be used to attach a detonation rocket engine to a support arm, such as brackets, fasteners, welding, etc., as well as any suitable attachment mechanisms to secure the other ends of the support arms to the axial drive shaft. In one example, a manifold housing (not shown) can be used to couple the axial drive shaft 106 to opposing support arms, so that fuel and/or oxygen can be effectively transferred from the axial fuel channel to the radial fuel channels.

Figure 4:
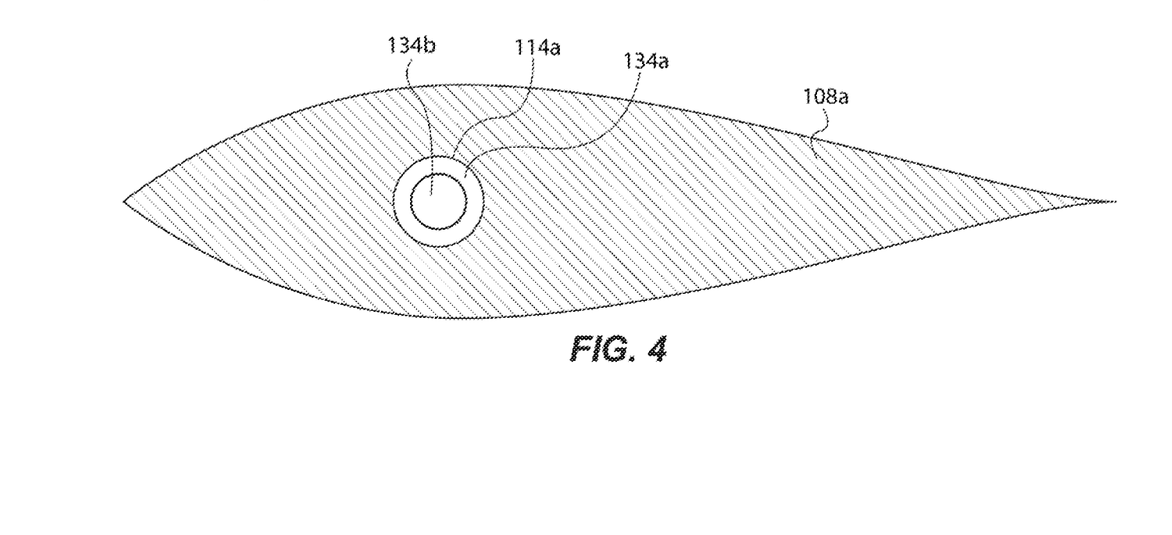
FIG. 4 is a cross sectional view of the support arm of FIG. 3, and taken across lines 4-4.

In one example, the support arm 108a (and 108b) can comprise an aerodynamic cross-sectional profile, which is also shown in the cross sectional view of FIG. 4. In this way, the support arm 108a can move through the air with minimal wind drag forces, which improves efficiency of the system (as compared to using round bar support arms, for instance). The aerodynamic cross-sectional profile can also be tapered in an outward or radial direction from a first end 132a proximate the axial drive shaft 106 to a second end 132b proximate the detonation rocket engine 110a. This tapered configuration provides the advantages of reducing mass of the system while providing sufficient structural support to the rocket engines, which maximizes efficiency while reducing weight.

FIG. 4 shows a cross sectional view of the support arm 108a, which illustrates that the radial fuel channel 114a that can comprise or support a pair of coaxially aligned supply lines 134a and 134b. The first supply line 134a can supply fuel (e.g., rocket fuel, hydrogen, etc.) to the detonation rocket engine 110a, while the second supply line 134b can supply oxygen to the detonation rocket engine 110a for mixture with the fuel and combustion. In another example, more than two supply lines could be incorporated. Alternatively, one supply line may be provided to transfer a mixture of fuel and oxygen (or other mixture) from the fuel supply source 116 through the single supply line and to the rocket engines for ignition and detonation. Note that the support arms can be substantially hollow to reduce mass, as opposed to the substantially solid body shown in FIG. 4, depending on system design requirements.

Figure 5:
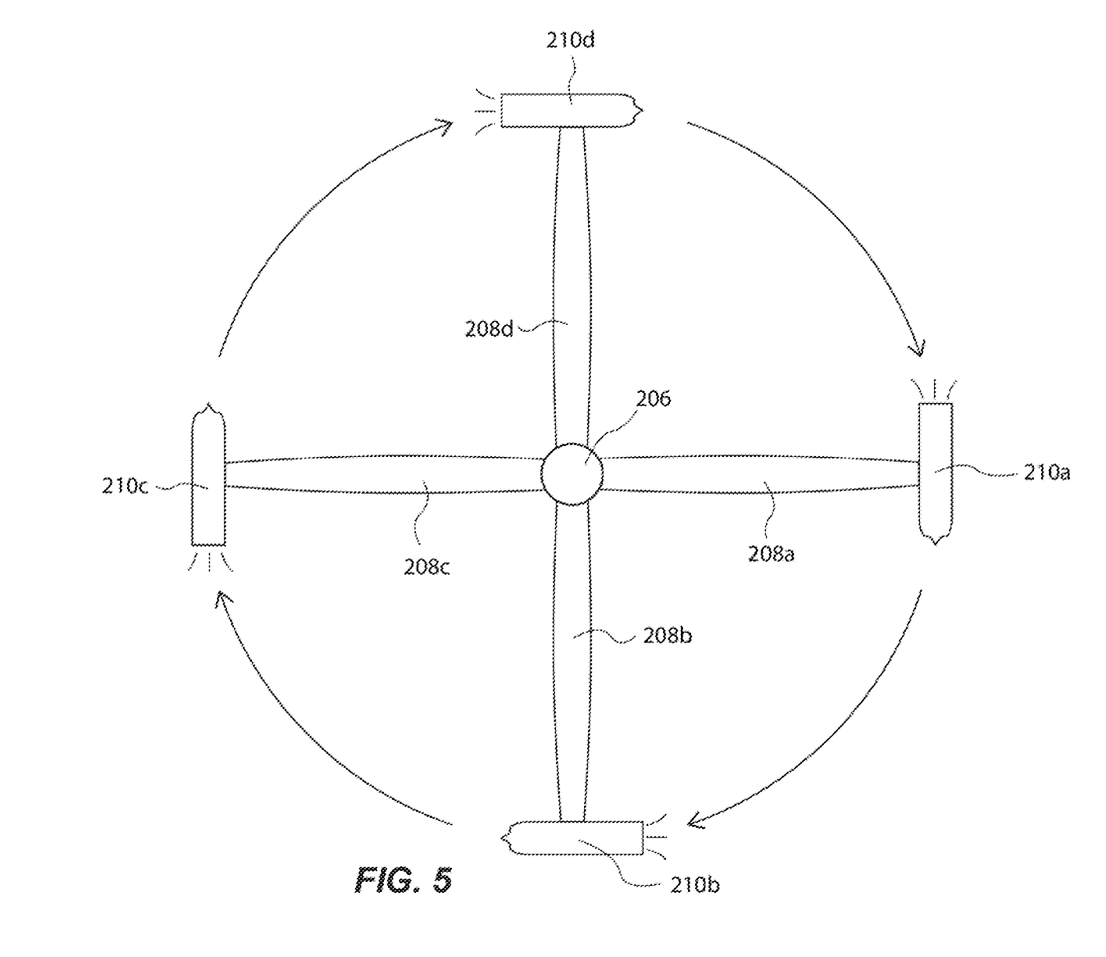
FIG. 5 is a top down view of a portion of a rotary detonation rocket engine generator system, and showing four support arms and four detonation rocket engines for rotating an axial drive shaft, in accordance with an example of the present disclosure.

FIG. 5 shows a top down view of a portion of a rotary detonation rocket engine generator system that includes an axial drive shaft 206, four opposing support arms 208a-d coupled to and radially extending from the axial drive shaft 206, and four opposing detonation rocket engines 210a-d supported at ends of respective support arms 208a-d. In this example, the opposing detonation rocket engines 210a-d are separated from each other by approximately 90 degrees, and can be similarly configured as described regarding FIG. 1A in terms of detonation and generating thrust to rotate the axial drive shaft 206 to produce electricity. It should be appreciated that the components shown in FIG. 5 can be incorporated with components of the system 100 of FIGS. 1A and 1B, namely the housing 120, the rotary union device 118, the fuel supply source 116, for generating electrical power.

Note that the support arms exemplified herein can be any length, and in one example, can define a rotational diameter of about 15 feet to about 50 feet, although smaller or larger diameters may be designed with appropriate consideration for rotational stresses and material limitations, depending on the desired generator output and intended application.

Non-limiting examples of suitable fuel that can be supplied to the detonation rocket engines include natural gas, hydrogen gas, hydrogen-carbon monoxide gas, landfill gases, biogas, jet fuel, or micronized solid fuels, including powered biomass or powered coal, and combinations thereof. In one aspect, the fuel can be pyrolysis gas, resulting from the thermal chemical conversion of solid fuels into fuel-gases. In examples where steam is supplied, steam can be provided from any suitable source. Although not required, high temperature, high pressure steam can provide sufficient efficiencies. For example, temperatures from about 100° C. to about 700° C. and pressures from about 10 atm to about 200 atm can be used. In one alternative, the steam can be produced from formation of a coal gasification synthesis gas. Other steam sources can include, but are not limited to, waste heat recovery, nuclear fission, and the like. The steam to fuel mass ratio can be adjusted and can generally range from about 1:1 to about 20:1. Similarly, the oxygen fuel mixture ratio will typically be operated with the stoichiometric amount of oxygen or with excess oxygen. Oxygen can be provided via air or oxygen enriched air, although other oxygen sources or oxygen-containing gases can be used. In one aspect, the oxygen fuel stoichiometric ratio can range from about 1 to about 7. In one alternative, the fluid can be a compressed gas which is allowed to expand through the rotary expanders in the absence of combustion.

Figure 6:
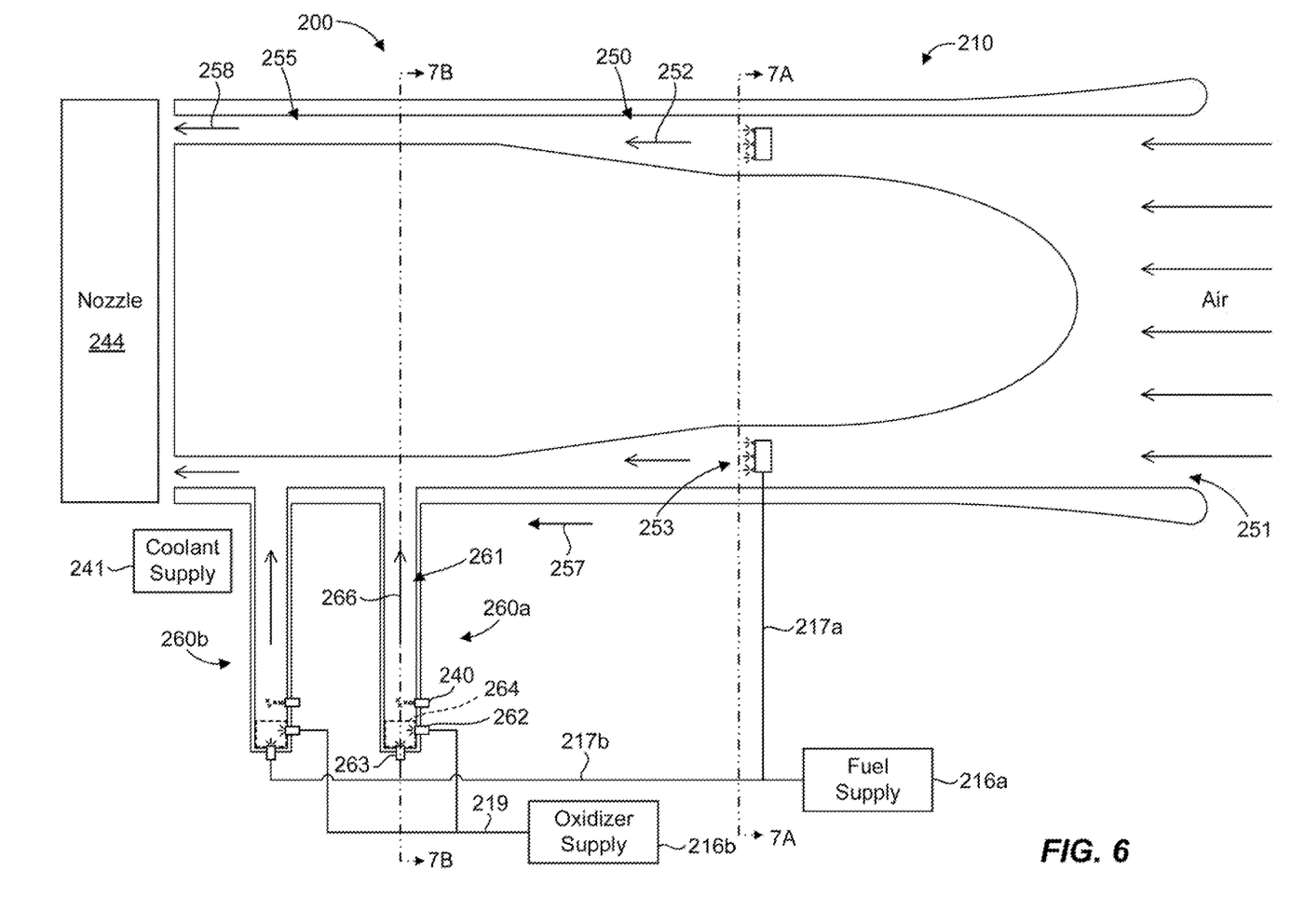
FIG. 6 is a schematic illustration of certain elements and features of a rotary detonation rocket engine generator system for producing electrical energy, in accordance with an example of the present disclosure.

FIG. 6 schematically illustrates certain elements and features of a rotary detonation rocket engine generator system 200 for producing electrical energy, in accordance with another example of the present disclosure. In general, the rotary detonation rocket engine generator system 200 can include any suitable element or feature of the rotary detonation rocket engine generator system 100 discussed above. Some elements or features are not discussed in detail with regard to the rotary detonation rocket engine generator system 200, such as an axial drive shaft operably coupleable to an electrical generator, and at least one support arm coupled to and extending radially from the axial drive shaft. The rotary detonation rocket engine generator system 200 can include at least one rotary detonation rocket engine 210, which can be supported at an end of at least one support arm (not shown).

Figure 7A:
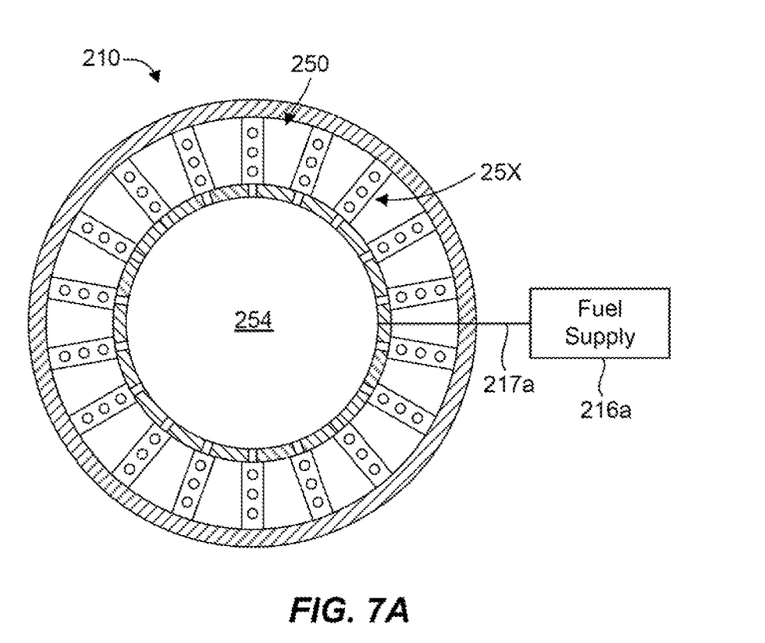
FIGS. 7A and 7B are cross-sectional views of a rotary detonation rocket engine of the rotary detonation rocket engine generator system of FIG. 6, in accordance with an example of the present disclosure.

The rotary detonation rocket engine 210 can include an air-fuel mixing chamber 250 operable to receive ambient air from an air inlet 251 and fuel from a fuel supply 216a (e.g., via a fuel channel 217a and fuel sprayers 252, such as a nozzle or an orifice) to form an air-fuel mixture 253. The fuel supplied to the air-fuel mixing chamber 250 can comprise hydrogen or any other suitable fuel disclosed herein or known in the art. In one aspect, as illustrated in the cross-sectional view of FIG. 7A, the air-fuel mixing chamber 250 can have an annular configuration. Multiple fuel sprayers 252 can be located in (e.g., distributed about) the air-fuel mixing chamber 250. The fuel sprayers 252 can receive fuel from a fuel distribution chamber 254 (FIG. 7A) that is in fluid communication with the fuel supply 216a. The annular-shaped air-fuel mixing chamber 250 can at least partially surround the fuel distribution chamber 254. In other words, the fuel distribution chamber 254 can be located radially within the annular-shaped air-fuel mixing chamber 250.

With further reference to FIG. 6, the rotary detonation rocket engine 210 can also include an annular combustion chamber 255 operable to receive the air-fuel mixture 253 from the air-fuel mixing chamber 250. In one aspect, the air inlet 251 can be configured to compress air into the annular combustion chamber 255. In some examples, the ambient air may be the only oxidizer that forms a mixture with the fuel in the air-fuel mixing chamber 250. Compressing ambient air by the forward-motion of the air-breathing rotary detonation rocket engine 210 may be more efficient and more cost-effective (e.g., lower hardware costs and oxidizer expense) compared to supplying an oxidant (e.g., stored compressed air or compressed oxygen) through an oxidant channel to the air-fuel mixing chamber 250 and/or the annular combustion chamber 255. Thus, the fuel channel 217a can supply fuel to the air-fuel mixing chamber 250 for combustion in the annular combustion chamber 255 without any need for a similar channel for suppling an oxidizer from an oxidizer supply. In a particular example, hydrogen (i.e., fuel) can be supplied to the air-fuel mixing chamber 250 through the fuel channel 217a and ambient air (i.e., oxidizer) can be supplied to the air-fuel mixing chamber 250 via the air inlet 251 by the forward movement of the rocket engine 210. Accordingly, no oxidant channel is required to supply stored oxidizer to the air-fuel mixing chamber 250.

In one aspect, the annular combustion chamber 255 can be cooled by external air flow as the rocket engine 210 moves through the air. In some examples, the annular combustion chamber 255 can be cooled by a coolant (e.g., water) that is provided by a coolant supply 241. In some examples, coolant from the coolant supply 241 can be pressurized by a pump (not shown) for circulation about (e.g., internal and/or external) the annular combustion chamber 255 (e.g., internal and/or external to the annular combustion chamber 255).

Figure 7B:
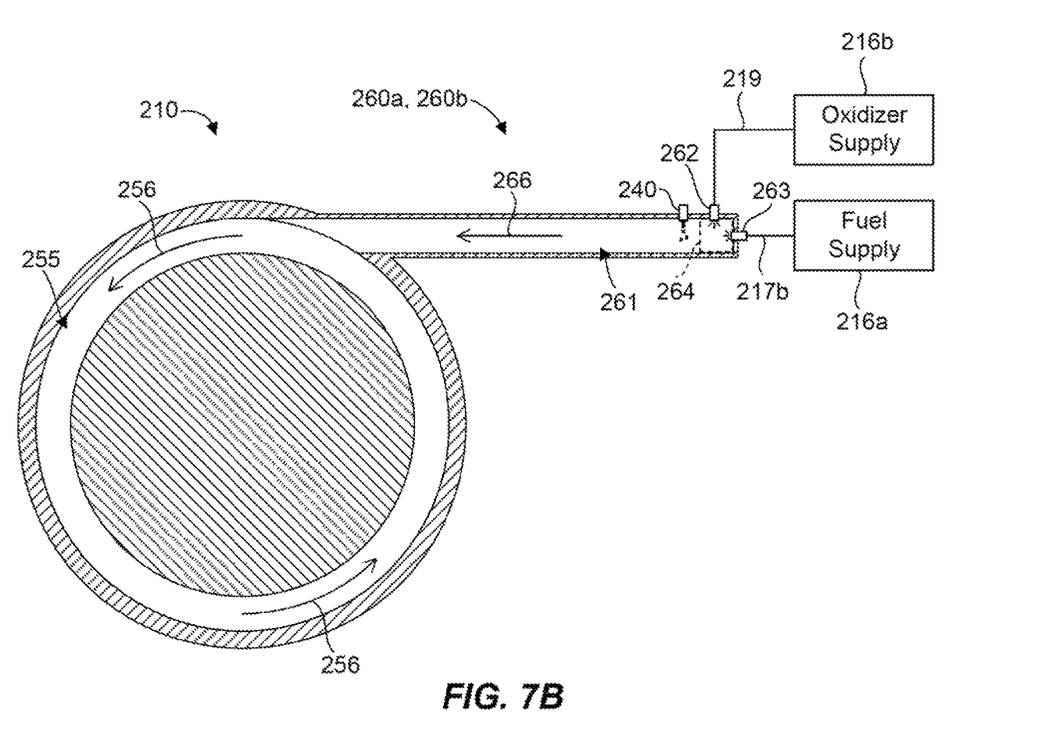

With continued reference to FIG. 6 and reference to the cross-sectional view of FIG. 7B, the rotary detonation rocket engine 210 can include at least one pulse detonation burner 260a, 260b. Each pulse detonation burner 260a, 260b can include a pulse detonation combustion chamber 261 in fluid communication with the annular combustion chamber 255. In some examples, the pulse detonation combustion chamber 261 can comprise a tube oriented perpendicular to a flow direction 257 of the air-fuel mixture 253 through the annular combustion chamber 255. Any suitable number of pulse detonation combustion chambers can be included, such as only a single pulse detonation combustion chamber or multiple pulse detonation combustion chambers (e.g., two pulse detonation combustion chambers as in the illustrated example). The pulse detonation combustion chamber 261 can be operable to receive an oxidizer from an oxidizer supply 216b (e.g., via an oxidizer channel 219 and oxidizer sprayers 262, such as a nozzle or an orifice) and fuel from the fuel supply 216a (e.g., via a fuel channel 217b and fuel sprayers 263, such as a nozzle or an orifice) to form an oxidizer-fuel mixture. In some examples, fuel and oxidizer from the fuel sprayers 263 and oxidizer sprayers 262 can be mixed in a mixing nozzle 264 and then introduced into the pulse detonation combustion chamber 261 via the mixing nozzle 264. The fuel supplied to the pulse detonation combustion chamber 261 can comprise hydrogen or any other suitable fuel disclosed herein or known in the art. The oxidizer supplied to the pulse detonation combustion chamber 261 can comprise oxygen or any other suitable oxidizer disclosed herein or known in the art. In the illustrated example, the fuel supply to the air-fuel mixing chamber 250 and the fuel supply to the pulse detonation combustion chamber 261 are the same fuel supply 216a, although it should be recognized that these fuel supplies can be different (e.g., supplying the same or different fuels). Thus, in this example, the fuel supply 216a can provide fuel for all combustion needs, whereas, the oxidizer supply may only be used for supplying oxidizer to the pulse detonation burner 260a, 260b. An igniter 240 can be positioned adjacent the fuel sprayers 263 and oxidizer sprayers 262 (or the optional mixing nozzle 264) for ignition and combustion of the fuel in the pulse detonation combustion chamber 261.

In one aspect, the pulse detonation combustion chamber 261 can be configured such that the oxidizer-fuel mixture detonates following ignition and creates a (linear) detonation wave 266 that travels along the pulse detonation chamber 261 to the annular combustion chamber 255. For example, the pulse detonation combustion chamber 261 can have an elongated (e.g., tube) configuration. The fuel sprayers 263 and oxidizer sprayers 262 can be located at one end of the pulse detonation combustion chamber 261. An opposite end of the pulse detonation combustion chamber 261 can terminate at the annular combustion chamber 255 (e.g., perpendicular to the flow direction 257 as shown in FIG. 6 and tangential to the annular combustion chamber 255 as shown in FIG. 7B). Combustion of the oxidizer-fuel mixture can generate a high-speed flame that undergoes deflagration-to-detonation transition by the time it enters the annular combustion chamber 255. The detonation wave 266 created in the pulse detonation combustion chamber 261 can enter the annular combustion chamber 255. Thus, the pulse detonation burner 260a, 260b can be used to generate a rotary detonation wave(s) 256 that travels in a circular path within the annular combustion chamber 255, as illustrated in FIG. 7B. Typically, the rotary detonation wave(s) 256 travels within the annular combustion chamber 255 at about 1-10 kHz. The rotary detonation wave 256 ignites and consumes the air-fuel mixture 253 in the annular combustion chamber 255 as the detonation wave 256 propagates and travels around the annular combustion chamber 255. This generates a high-pressure zone behind the detonation wave 256, which expands and, due to the geometric constraints, exits the chamber 255, thereby generating thrust force for the rotary detonation rocket engine 210. Fresh air-fuel mixture 253 enters the annular combustion chamber 255 behind the detonation wave 256, which primes that section of the annular combustion chamber 255 for the detonation wave 256 to continue on the next revolution. The rotary detonation wave(s) 256 can be reinitiated or maintained regularly by operation of the pulse-detonation burner 260a, 260b, which can be timed to provide detonation waves 266 in synchronization with the rotary detonation wave(s) 256 in the annular combustion chamber 255. In other words, the pulse-detonation burner 260a, 260b can be fired repeatedly to ignite the air-fuel mixture 253 in the much larger annular combustion chamber 255 to provide thrust force. The thrust force provided by the rotary detonation rocket engine 210 can cause rotation of the axial drive shaft to drive the electrical generator to produce electrical energy.

In some examples, the exhaust 258 from the annular combustion chamber 255 can be channeled through a nozzle 244 (e.g., an expansion outlet) to increase thrust. The nozzle 244 can be contoured to optimize thrust upon exit of gases from the detonation rocket engine 210. In one aspect, the nozzle 244 can be a de Laval configuration, although other nozzle contours and throat configurations can be used.

Figure 8:
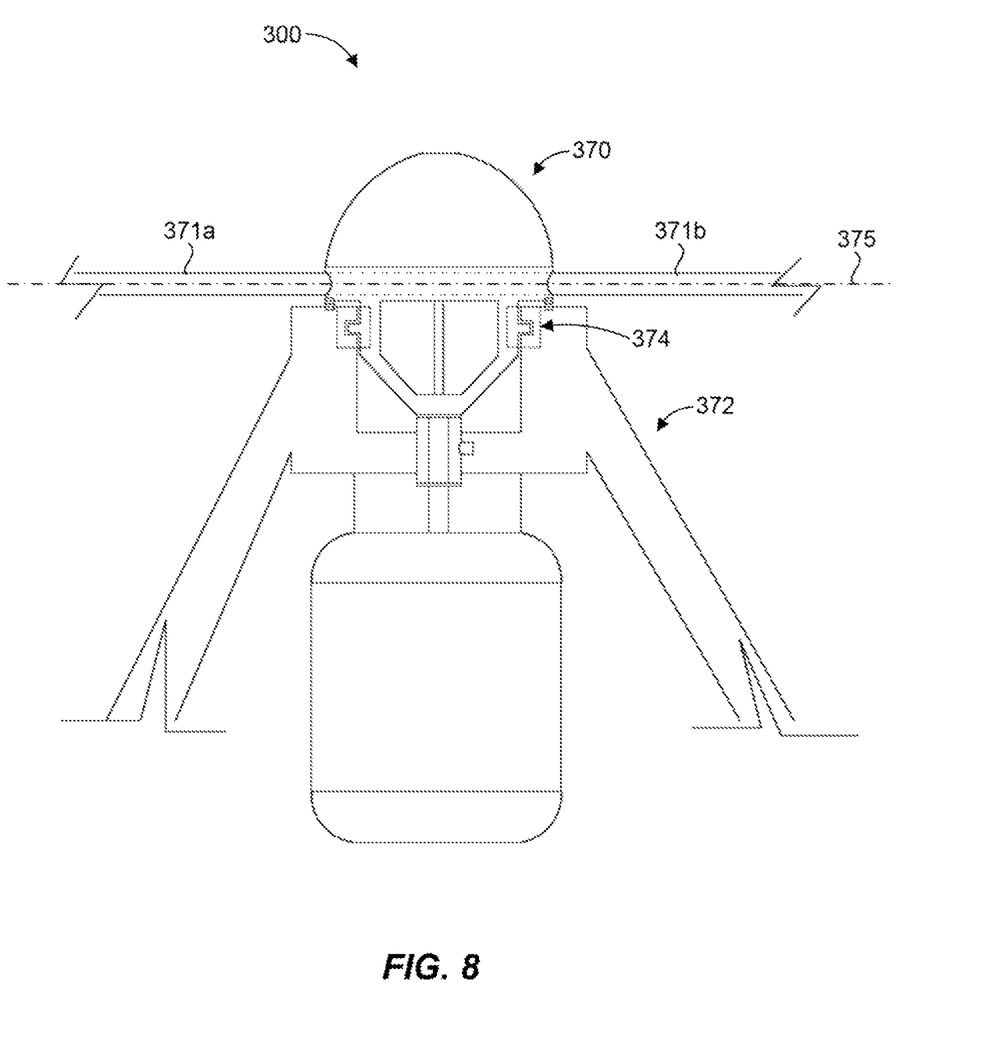
FIG. 8 is an illustration of certain elements and features of a rotary detonation rocket engine generator system for producing electrical energy, in accordance with an example of the present disclosure.

FIG. 8 illustrates another aspect of a rotary detonation rocket engine generator system 300 in accordance with the present disclosure. This figure illustrates a rotating chassis 370 fixedly coupled to and supporting at least one support arm 371a, 371b for supporting one or more rotary detonation rocket engines (not shown) as in any of the examples discussed herein. The generator system 300 can also include a fixed base 372 rotationally coupled to and supporting the rotating chassis 370. The fixed base 372 can be rotationally coupled to the rotating chassis 370 in any suitable manner. In some examples, the fixed base 372 can be rotationally coupled to the rotating chassis 370 via a bearing 374. In a particular example, the bearing 374 can comprise a slewing bearing or ring, which is a type of roller-bearing system that can maintain rotary motion of the rotating chassis 370 and the support arm 371a, 371b (and attached rocket engines) in a horizontal plane 375, even when wind-shear forces would tend to cause a misalignment of the rotating chassis 370 and the support arm 371a, 371b out of the horizontal plane 375.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:

1. A rotary detonation rocket engine generator system for producing electrical energy, comprising:
   an axial drive shaft operably coupleable to an electrical generator;
   at least one support arm coupled to and extending radially from the axial drive shaft; and
   at least one rotary detonation rocket engine supported at an end of the at least one support arm, the at least one rotary detonation rocket engine having
      an air-fuel mixing chamber operable to receive ambient air from an air inlet and fuel from a first fuel supply to form an air-fuel mixture,
      an annular combustion chamber operable to receive the air-fuel mixture from the air-fuel mixing chamber, and
      at least one pulse detonation combustion chamber in fluid communication with the annular combustion chamber, the at least one pulse detonation combustion chamber being operable to receive an oxidizer from an oxidizer supply and fuel from a second fuel supply to form an oxidizer-fuel mixture, wherein the at least one pulse detonation combustion chamber is configured such that the oxidizer-fuel mixture detonates following ignition and creates a detonation wave that travels along the at least one pulse detonation chamber to the annular combustion chamber and ignites the air-fuel mixture as the detonation wave travels around the annular combustion chamber thereby generating thrust force to propel the at least one rotary detonation rocket engine which in turn causes rotation of the axial drive shaft to drive the electrical generator to produce electrical energy.

2. The rotary detonation rocket engine generator system of claim 1, wherein the first and second fuel supplies are a same fuel supply.

3. The rotary detonation rocket engine generator system of claim 1, wherein the fuel comprises hydrogen.

4. The rotary detonation rocket engine generator system of claim 1, wherein the oxidizer comprises oxygen.

5. The rotary detonation rocket engine generator system of claim 1, wherein the at least one pulse detonation combustion chamber comprises a plurality of pulse detonation combustion chambers.

6. The rotary detonation rocket engine generator system of claim 1, wherein the at least one pulse detonation combustion chamber comprises a tube oriented perpendicular to a flow direction of the air-fuel mixture through the annular combustion chamber.

7. The rotary detonation rocket engine generator system of claim 1, wherein the ambient air is a sole oxidizer forming a mixture with the fuel in the air-fuel mixing chamber.

8. The rotary detonation rocket engine generator system of claim 1, further comprising a coolant supply operably coupled to the annular combustion chamber to cool the annular combustion chamber.

9. The rotary detonation rocket engine generator system of claim 1, further comprising:
   a rotating chassis fixedly coupled to and supporting the at least one support arm; and
   a fixed base rotationally coupled to and supporting the rotating chassis.

10. The rotary detonation rocket engine generator system of claim 9, wherein the fixed base is rotationally coupled to the rotating chassis via a bearing.

11. The rotary detonation rocket engine generator system of claim 10, wherein the bearing comprises a slewing bearing.

12. The rotary detonation rocket engine generator system of claim 1, wherein the at least one support arm comprises opposing support arms, and wherein the at least one detonation rocket engine comprises opposing detonation rocket engines each coupled to a respective one of opposing support arms.

13. The rotary detonation rocket engine generator system of claim 12, wherein the axial drive shaft comprises an axial fluid channel extending through the axial drive shaft, and wherein the opposing support arms each include a radial fluid channel in fluid communication with the axial fluid channel and the opposing detonation rocket engines, such that the radial fluid channels and the axial fluid channel define a fuel supply line which supplies the fuel to the opposing detonation rocket engines from at least one of the first fuel supply and the second fuel supply.

14. The rotary detonation rocket engine generator system of claim 13, further comprising a rotary union device coupled to the axial drive shaft which transfers fuel from at least one of the first fuel supply and the second fuel supply and into the axial fluid channel of the axial drive shaft.

15. The rotary detonation rocket engine generator system of claim 13, wherein the axial fluid channel and the radial fluid channels each include at least two dedicated channels for parallel transport of fuel and oxygen to the opposing detonation rocket engines.

16. The rotary detonation rocket engine generator system of claim 12, wherein the opposing support arms define a rotational diameter from about 15 feet to about 50 feet.

17. The rotary detonation rocket engine generator system of claim 12, wherein the opposing detonation rocket engines comprise a pair of detonation rocket engines, and wherein the opposing support arms comprise a pair of support arms coupled to and extending generally orthogonally from the axial drive shaft and supporting respective detonation rocket engines, such that the detonation rocket engines are separated from each other by approximately 180 degrees.

18. The rotary detonation rocket engine generator system of claim 12, wherein the opposing detonation rocket engines comprise at least three detonation rocket engines separated substantially equally from each other around a circumferential envelope defined by rotary motion of the at least three detonation rocket engines.

19. The rotary detonation rocket engine generator system of claim 18, wherein the at least three detonation rocket engines include from three to eight detonation rocket engines.

20. The rotary detonation rocket engine generator system of claim 1, wherein the at least one support arm has an aerodynamic cross-sectional profile.

21. The rotary detonation rocket engine generator system of claim 20, wherein the aerodynamic cross-sectional profile is tapered in a radial direction from proximate the axial drive shaft to the at least one detonation rocket engine supported by the at least one support arm.

22. The rotary detonation rocket engine generator system of claim 1, further comprising a housing that encloses the at least one detonation rocket engine, the at least one support arm, and at least a portion of the axial drive shaft.

23. The rotary detonation rocket engine generator system of claim 22, wherein the housing further comprises a fluid outlet configured to allow removal of exhaust products from within the housing.

24. The rotary detonation rocket engine generator system of claim 1, wherein the axial drive shaft is configured to be oriented vertically relative to a ground surface during operation.

25. The rotary detonation rocket engine generator system of claim 1, wherein the at least one detonation rocket engine comprises a pair of detonation rocket engines, and wherein the at least one support arm comprises a pair of support arms coupled to the axial drive shaft and extending in generally opposite directions from each other about the axial drive shaft, wherein each of the axial drive shaft and the pair of support arms comprise an oxygen supply channel and a fuel supply channel for supplying fuel and oxygen to the pair of detonation rocket engines.

26. The rotary detonation rocket engine generator system of claim 1, further comprising the electrical generator coupled to the axial drive shaft.

\* \* \* \* \*